US010049233B2

(12) United States Patent
Sekiguchi (10) Patent No.: US 10,049,233 B2
(45) Date of Patent: Aug. 14, 2018

(54) INFORMATION PROCESSING APPARATUS, SECURITY MANAGEMENT METHOD AND INFORMATION PROCESSING SYSTEM THAT SWITCHES FROM ONE MONITORING UNIT TO ANOTHER IN ACCORDANCE WITH OPERATING MODE

(71) Applicant: CANON DENSHI KABUSHIKI KAISHA, Chichibu-shi (JP)

(72) Inventor: Azusa Sekiguchi, Funabashi (JP)

(73) Assignee: Canon Denshi Kabushiki Kaisha, Chichibu-shi (JP)

( * ) Notice: Subject to any disclaimer, the term of this patent is extended or adjusted under 35 U.S.C. 154(b) by 21 days.

(21) Appl. No.: 14/858,262

(22) Filed: Sep. 18, 2015

(65) Prior Publication Data

US 2016/0105451 A1 Apr. 14, 2016

(30) Foreign Application Priority Data

Oct. 9, 2014 (JP) .................................. 2014-208330
Aug. 11, 2015 (JP) .................................. 2015-159129

(51) Int. Cl.
| G06F 12/14 | (2006.01) |
| H04L 29/06 | (2006.01) |
| G06F 11/30 | (2006.01) |
| G06F 9/44 | (2018.01) |
| G06F 21/74 | (2013.01) |
| G06F 21/55 | (2013.01) |
| G06F 9/46 | (2006.01) |

(52) U.S. Cl.
CPC ............... *G06F 21/74* (2013.01); *G06F 9/46* (2013.01); *G06F 11/30* (2013.01); *G06F 21/554* (2013.01); *H04L 63/0236* (2013.01); *H04L 63/145* (2013.01)

(58) Field of Classification Search
CPC ... G06F 21/74; G06F 9/46; G06F 9/00; G06F 11/00; G06F 21/554; H04L 63/145; H04L 63/0236
USPC ............ 726/22; 713/165, 188; 717/127, 128
See application file for complete search history.

(56) References Cited

U.S. PATENT DOCUMENTS

| 2002/0087885 | A1* | 7/2002 | Peled ................ G06F 17/30017 726/26 |
| 2006/0294367 | A1* | 12/2006 | Yoshioka ............ H04L 63/1466 713/156 |
| 2007/0118646 | A1* | 5/2007 | Gassoway ............... G06F 21/57 709/225 |
| 2008/0225337 | A1 | 9/2008 | Yano |
| 2009/0019437 | A1* | 1/2009 | Feng ....................... G06F 21/53 718/1 |
| 2010/0211681 | A1* | 8/2010 | Chan ..................... G06F 15/173 709/226 |
| 2010/0325685 | A1* | 12/2010 | Sanbower ............. G06F 21/554 726/1 |
| 2012/0192278 | A1* | 7/2012 | Kito ........................ G06F 21/52 726/24 |

(Continued)

FOREIGN PATENT DOCUMENTS

JP 2008-226121 3/2007

*Primary Examiner* — Aravind K Moorthy
(74) *Attorney, Agent, or Firm* — Fitzpatrick, Cella, Harper & Scinto (57) ABSTRACT

When security software is activated, it is determined whether the mode is a safe mode or a normal mode. And the security software switches a monitor in accordance with the mode.

19 Claims, 11 Drawing Sheets (56) References Cited

U.S. PATENT DOCUMENTS

| | | | |
|---|---|---|---|
| 2012/0198413 A1* | 8/2012 | Dang | G06F 8/71 |
| | | | 717/101 |
| 2012/0226910 A1* | 9/2012 | Hutzler | G06F 21/88 |
| | | | 713/182 |
| 2013/0252587 A1* | 9/2013 | Ko | H04W 12/06 |
| | | | 455/411 |
| 2014/0325684 A1* | 10/2014 | Takeyasu | H04L 63/20 |
| | | | 726/29 |
| 2015/0006695 A1* | 1/2015 | Gupta | H04L 41/32 |
| | | | 709/223 |
| 2016/0085976 A1* | 3/2016 | Schiffman | G06F 21/62 |
| | | | 726/30 |

\* cited by examiner

| TARGET DEVICE | CONTROL METHOD |
|---|---|
| USB MEMORY | USE PROHIBITED |
| SD CARD | USE PERMITTED |

FIG. 5

| DEVICE NAME | VENDOR ID | PRODUCT ID | SERIAL NUMBER |
|---|---|---|---|
| USB MEMORY 1 | 0×12 | 0×56 | 1234567890 |
| USB MEMORY 2 | 0×12 | 0×78 | 12abcd3456 |
| USB MEMORY 3 | 0×13 | 0×99 | Abcd123456 |

INFORMATION PROCESSING APPARATUS, SECURITY MANAGEMENT METHOD AND INFORMATION PROCESSING SYSTEM THAT SWITCHES FROM ONE MONITORING UNIT TO ANOTHER IN ACCORDANCE WITH OPERATING MODE

BACKGROUND OF THE INVENTION

Field of the Invention

The present invention relates to an information processing apparatus and a control technique of controlling the same, in particular, a security management technique.

Description of the Related Art

In recent years, there are provided various kinds of general-purpose storage media such as a Secure Digital memory card (to be referred to as an SD card hereinafter) and a USB flash memory (to be referred to as a USB memory hereinafter). These storage media are attached to an information processing apparatus such as a personal computer (to be referred to as a PC hereinafter) and used to read out data in the storage media or save data created by the information processing apparatus in the storage media. In addition, recently, various viruses enter and lie dormant in a PC and cause damage such as data theft, eavesdropping, alteration, leakage, and attack. A company needs to prevent people from bringing out a confidential file of the company saved in an information processing apparatus using a storage medium or bringing in a file infected with a virus into an information processing apparatus in the company. There is known a technique of controlling use of a detachable storage medium, as disclosed in Japanese Patent Laid-Open No. 2008-226121.

In the conventional technique, however, control is not necessarily appropriately performed in a safe mode environment. The safe mode indicates the following activation state. In an information processing apparatus such as a PC, conventionally, an OS (Operation System) operates after power-on as the operation environment of provided functions (various kinds of applications). Modes (to be referred to as "operating modes" hereinafter) to operate the OS include a normal mode (normal program execution mode) and a safe mode. The normal mode is a mode to provide the functions of the apparatus to a user without limitation.

On the other hand, the safe mode is an operating mode that provides minimum functions by decreasing the number of modules to be activated as compared to the normal mode in a case where, for example, the operation of the apparatus has become unstable because of some reason (for example, an error in a system setting). For this reason, even in a case where a failure has occurred in the information processing apparatus, the apparatus can eliminate the cause of the failure and restore the stable function providing environment again by being activated in the safe mode.

That is, in a state in which only minimum modules operate in the safe mode environment, the same security as in the normal mode does not necessarily function. Even if the same security as in the normal mode functions in the safe mode environment, achieving the original purpose of activating the apparatus in the safe mode, that is, the purpose of restoring and improving the system may be impeded.

SUMMARY OF THE INVENTION

The present invention provides an information processing apparatus having an appropriate security function according to the operating mode of the information processing apparatus and a security management method.

According to an aspect of the present invention, there is provided an information processing apparatus that operates in one of a normal mode that is a normal program execution mode and a safe mode in which a predetermined minimum software module is executed, comprising: a detection unit configured to detect whether an operating mode is the safe mode or the normal mode; and a security management unit configured to manage security of the information processing apparatus, wherein in accordance with the mode detected by the detection unit, the security management unit switches a unit configured to monitor the information processing apparatus.

According to the present invention, it is possible to implement access control of high security level in the safe mode.

Further features of the present invention will become apparent from the following description of exemplary embodiments with reference to the attached drawings.

DESCRIPTION OF THE EMBODIMENTS

The embodiments of the present invention will now be described with reference to the accompanying drawings. Note that the embodiments to be described below are examples of detailed implementation of the present invention or detailed examples of the arrangement described in the appended claims.

[First Embodiment]

<System Arrangement>

Figure 1:
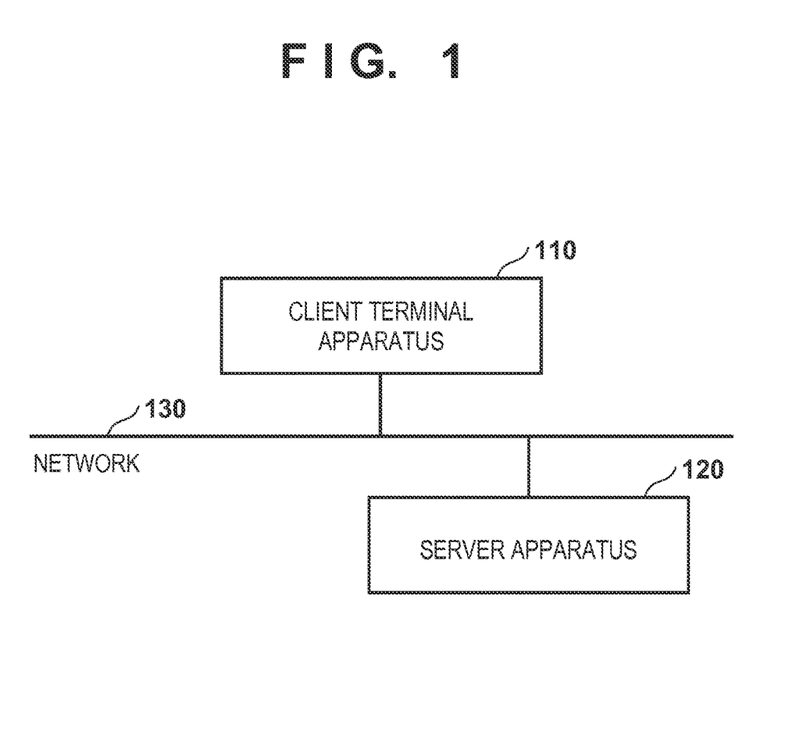
FIG. 1 is a block diagram showing an example of the system arrangement of an information processing system.

The arrangement of an information processing system according to this embodiment will be described with reference to the block diagram of FIG. 1. As shown in FIG. 1, the information processing system according to this embodiment includes computers, that is, information processing apparatuses 110 and 120. The information processing apparatuses are connected to a network 130 such as a LAN or the Internet. The information processing apparatus 110 will be referred to as a client terminal apparatus and the information processing apparatus 120 as a server apparatus hereinafter.

Note that the client terminal 110 may include a plurality of apparatuses. Each of the client terminal apparatus 110 and the server apparatus 120 can be any apparatus such as a PC or a portable terminal apparatus as long as it can execute each process to be described later as processing to be performed by the information processing apparatus. Although the client terminal apparatus 110 is connected via the network 130, it may be a standalone apparatus without intervention of the network 130.

<Client Terminal Apparatus 110>

Figure 2:
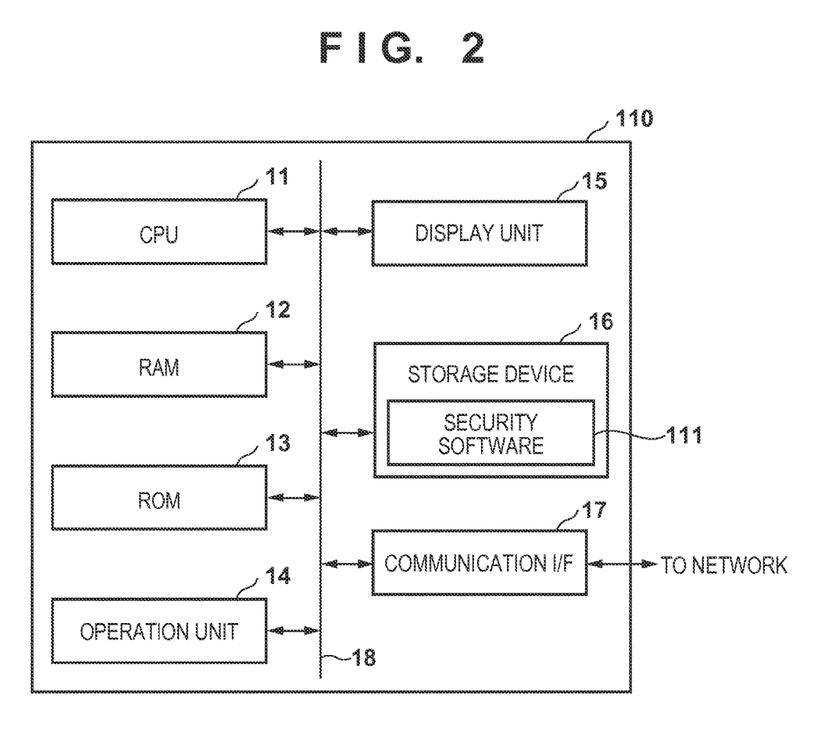
FIG. 2 is a block diagram showing the hardware arrangement of a client terminal apparatus 110.

The hardware arrangement of the client terminal apparatus 110 according to this embodiment will be described with reference to FIG. 2. A description will be made assuming that the client terminal apparatus 110 and the server apparatus 120 have the same hardware arrangement. The hardware arrangement will be explained using the client terminal apparatus 110 as an example. A CPU (Central Processing Unit) 11 executes various kinds of processing using computer programs and data stored in a RAM (Random Access Memory) 12 or a ROM (Read Only Memory) 13, thereby controlling the operation of the entire apparatus and executing each process to be described later as processing to be performed by the apparatus.

The RAM 12 has an area to temporarily store computer programs and data loaded from a storage device 16 and an area to temporarily store various kinds of data received from an external device via an I/F (interface) 17. The RAM 12 also has a work area used by the CPU 11 to execute various kinds of processing. The RAM 12 can thus provide various kinds of areas appropriately. The ROM 13 stores the setting data, boot program, and the like of the apparatus.

An operation unit 14 is formed from a mouse or a keyboard. The operator of the apparatus can input various kinds of instructions to the CPU 11 by operating the operation unit 14. A display unit 15 is formed from a CRT or a liquid crystal screen, and can display a processing result of the CPU 11 by an image, text, or the like. The storage device 16 is a mass information storage device represented by a hard disk drive. An OS (Operating System) and computer programs and data used to cause the CPU 11 to execute each process to be described later as processing to be performed by the apparatus are saved in the storage device 16. The computer program includes security software 111. The security software 111 is a program for security management of ensuring safety of data, programs, and the like in the client terminal 110, and has, for example, a function of limiting connection of a device based on a connection enable/disable setting of the device, and a function of limiting communication based on a communication enable/disable setting. The computer programs and data saved in the storage device 16 are appropriately loaded to the RAM 12 under the control of the CPU 11, and processed by the CPU 11. The I/F 17 is used to connect the apparatus to the network 130. The apparatus can perform data communication with an external device connected to the network 130. All the above-described units are connected to a bus 18.

<Server Apparatus 120>

Figure 3:
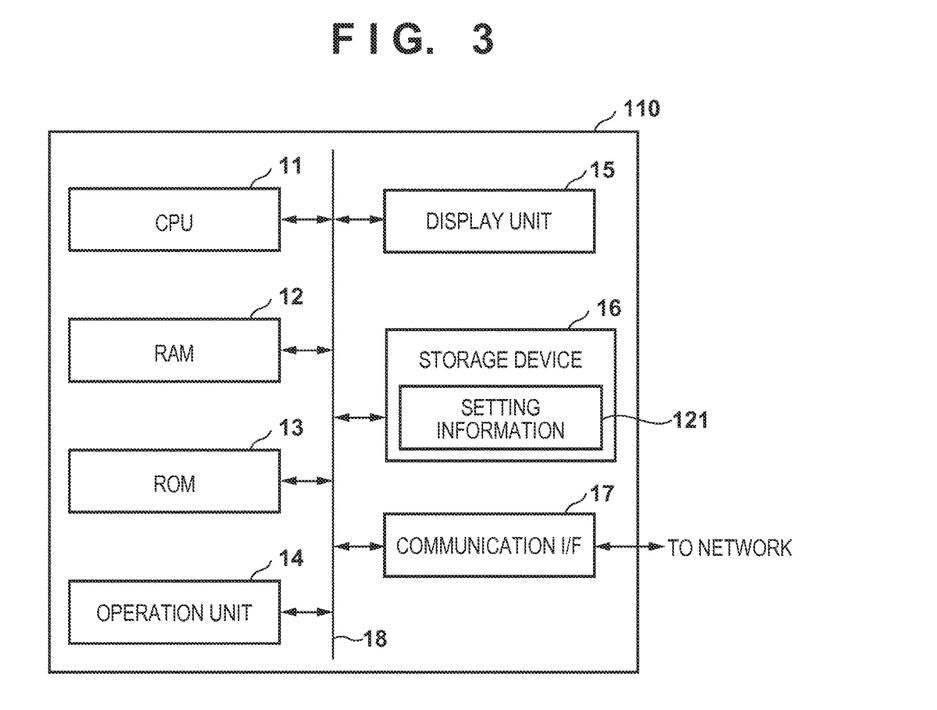
FIG. 3 is a block diagram showing the hardware arrangement of a server apparatus 120.

The hardware arrangement of the server apparatus is assumed to be the same as the above-described hardware arrangement of the client terminal apparatus 110, as shown in FIG. 3. That is, the CPU 11 of the server apparatus 120 performs data communication with an external device via the I/F 17 of the server apparatus 120 using computer programs and data saved in the storage device 16 of the server apparatus, and also executes each process to be described later as processing to be performed by the server apparatus. In addition, setting information 121 is registered in the storage device 16 of the server apparatus 120.

Figure 4:
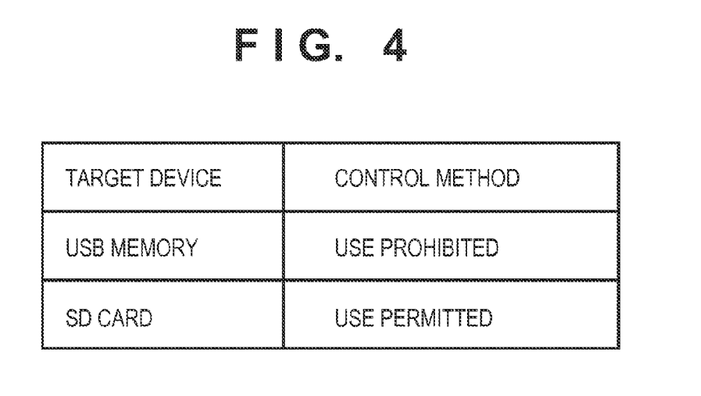
FIG. 4 is a view showing an example of setting information 121.
Figure 5:
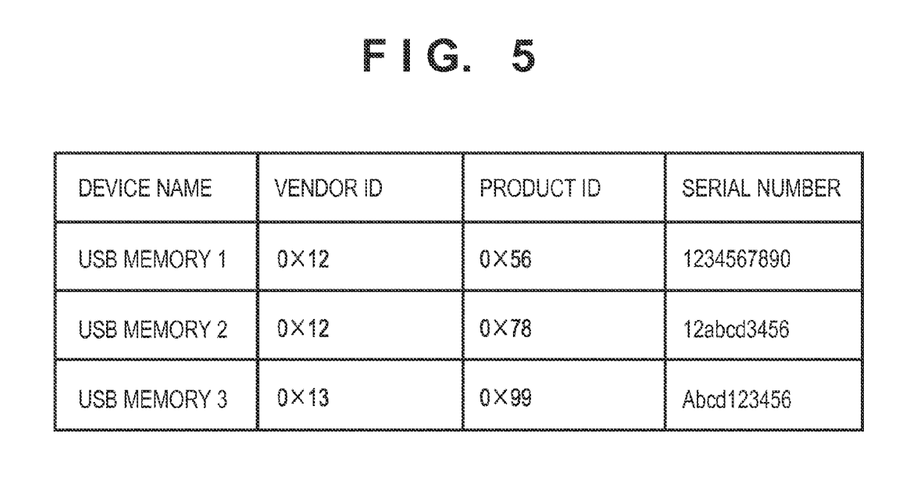
FIG. 5 is a view showing an example of setting information 121.

As shown in FIG. 4, the setting information 121 registers the names of target devices usable by the client terminal apparatus 110 and control methods. For example, the setting information 121 of the client terminal apparatus 110 registers that use of a USB memory is prohibited, and use of an SD card is permitted. The setting information 121 may be USB memory information of permission targets. This information can be either information capable of individually identifying a USB memory, including a vendor ID, a product ID, and a serial number, or information representing permission of every USB memory, as shown in FIG. 5. The setting information 121 may be USB memory information of prohibition targets.

Note that instead of causing the storage device 16 of the server apparatus 120 to manage the setting information 121 of the client terminal apparatus 110 at once, each client terminal apparatus 110 may hold the setting information 121 of its own. In this case, the server apparatus 120 is not indispensable. Note that FIGS. 4 and 5 show mere examples, and a user name, a terminal name, and the like may be registered.

<Processing of Client Terminal Apparatus>

Figure 6:
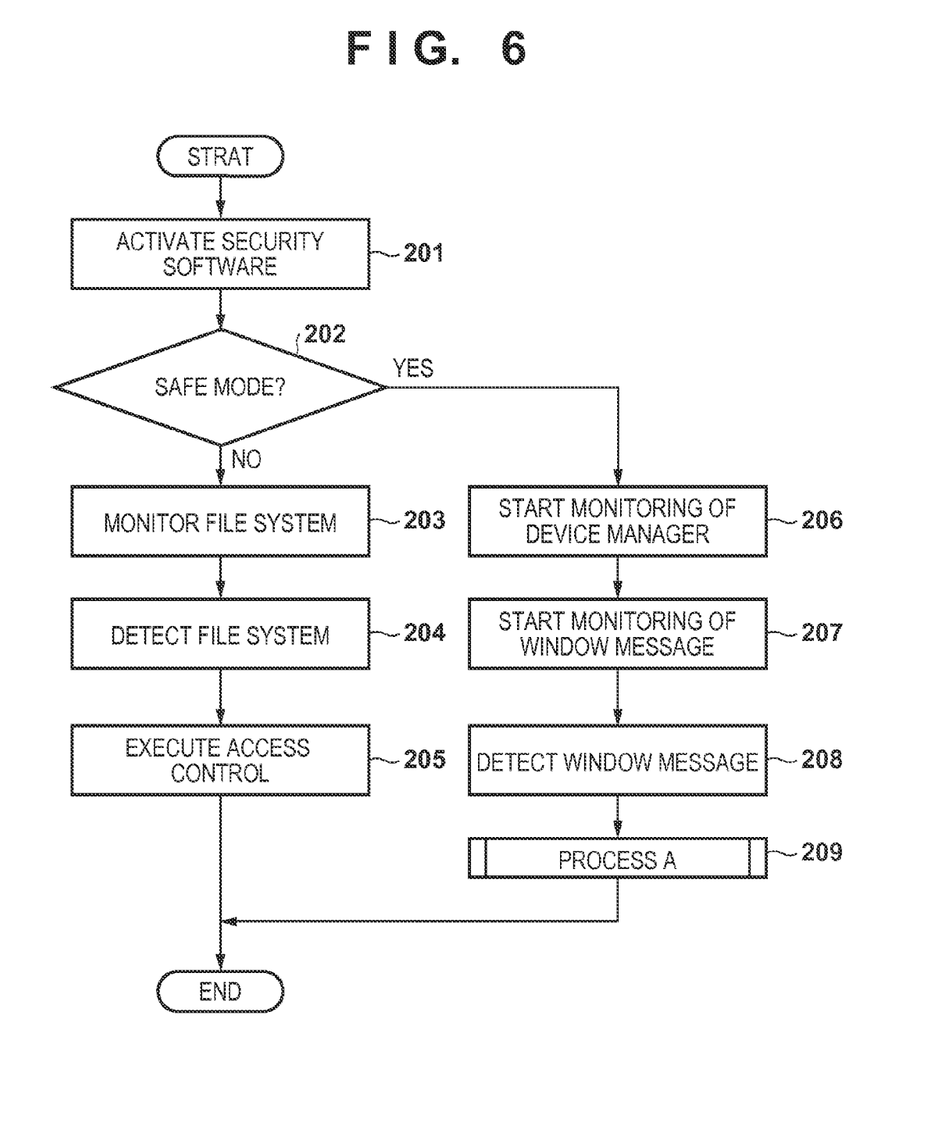
FIG. 6 is a flowchart showing processing of the client terminal apparatus 110.

The security software 111 saved in the storage device 16 of the client terminal apparatus 110 will be described next with reference to the flowchart of FIG. 6. This will be explained here using a USB memory as an example. The security software 111 is software configured to identify the operating mode of the local apparatus (here, the client terminal apparatus 110), change the control method, and control access. Note that the procedure shown in FIG. 6 will be described assuming that each client terminal apparatus 110 holds the setting information 121 of its own. In this embodiment, for example, the Windows® operating system is executed in the client terminal 110, and a program is executed under the management of the operating system. The operating system is not limited to Windows, and any other operating system that implements a safe mode can be used, as a matter of course.

In step 201, the CPU 11 loads the security software 111 from the storage device 16 to the RAM 12, and activates the loaded security software 111. The security software 111 may automatically be activated as a service program, or arbitrarily activated in accordance with an operation instruction from the user. Next, the security software 111 determines whether the operating mode is the safe mode (step 202). If the operating mode is the normal mode that is the normal program execution mode, the process advances to step 203. If the operating mode is the safe mode, the process advances to step 206. The safe mode is a mode of the operating system in which minimum software modules such as device drivers and services are executed, as described above. "Minimum" indicates predetermined modules, for example, user interfaces such as a keyboard and a display and a file system for executing the operating system.

<In Case of Normal Mode>

In step 203, a file system filter driver is loaded, and the file system of the PC is monitored. The file system filter driver is a program located in a layer above a file system driver and under a system call API, and can monitor all processes of the file system. At this time, the security software 111 transmits the setting information 121 to the loaded file system filter driver. When a USB memory is inserted, a file system is created. In step 204, the created file system is detected. More specifically, I/O Request Packet (to be referred to as "IRP" hereinafter) of the file system is monitored, and the file system filter driver intercepts IRP such as IRP_MJ_WRITE or IRP_MJ_SET_INFORMATION. In step 205, it is determined based on the setting information 121 whether the detected device is usable. For example, since the setting information 121 prohibits use of a USB memory, the file system filter driver returns STATUS_ACCESS_DENIED to the driver of the USB memory to make it unusable. That is, a response representing access prohibition is returned to limit or prohibit use. The determination may be done based on USB memory information transferred in step 203 and setting information as shown in FIG. 5.

<In Case of Safe Mode>

On the other hand, if the mode is the safe mode in step 202, in step 206, a device manager is monitored using API, for example, RegisterDeviceNotification. The device manager is one of utility programs of Windows® OS, and can manage the hardware of the computer. As details of management, the device manager can confirm a list or normal operation of devices connected to the computer or enable/disable a device. In step 207, a window message, for example, WM_DEVICECHANGE transmitted to the system at the time of attaching/detaching a device is monitored. In step 208, a window message is intercepted or monitored. Upon detecting a window message, for example, DBT_DEVICEARRIVAL or DBT_DEVICEREMOVECOMPLETE transmitted at the time of attaching/detaching a device, the process advances to step 209.

<Process 1 of Step 209>

Figure 7:
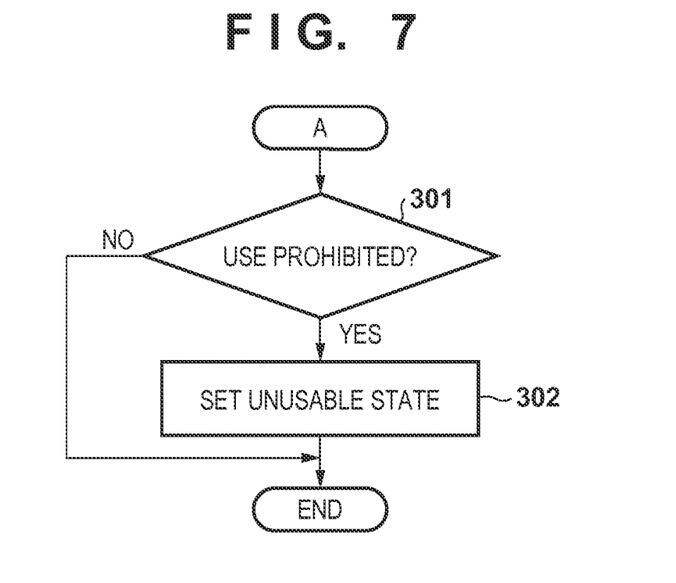
FIG. 7 is a flowchart showing the process of step 209.

Details of the process of step 209 will be described next with reference to FIG. 7 that shows the flowchart of the process. In step 301, it is determined based on the setting information 121 whether the device detected by monitoring a window message, for example, a USB-connected storage medium (USB memory) is usable. If unusable in the setting, the device is set in an unusable state in step 302. For example, in a case where the inserted device is a USB memory, since the setting information 121 shown in FIG. 4 prohibits use of a USB memory, the state of the USB memory is disabled by the device manager. The USB memory thus becomes unusable. In a case to permit use, if the state of the inserted USB memory is disabled, it is enabled to make the memory usable.

<Process 2 of Step 209>

Figure 8:
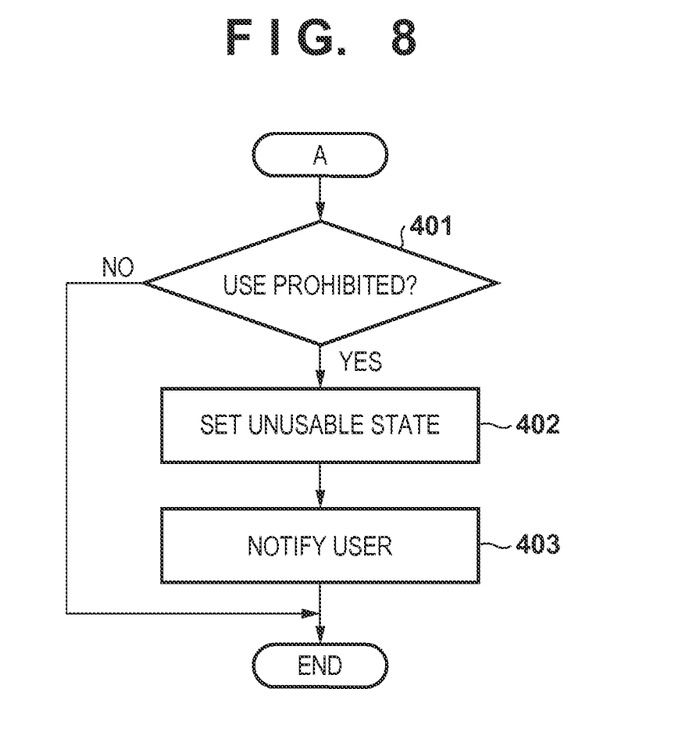
FIG. 8 is a flowchart showing the process of step 209.
Figure 9:
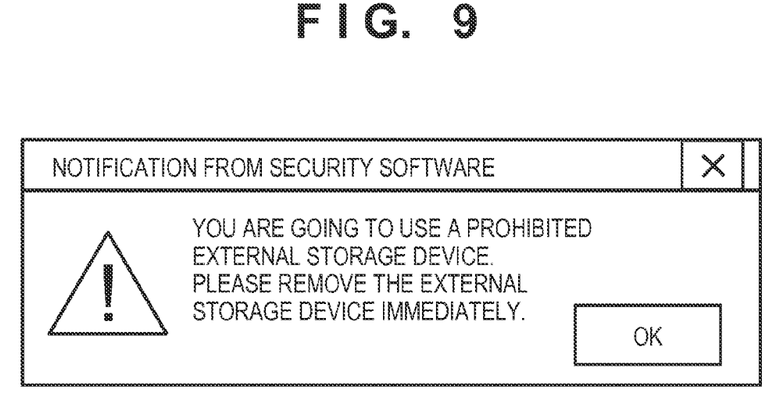
FIG. 9 is a view showing an example of a display screen displayed on the client terminal apparatus.

Details of another process of step 209 will be described with reference to FIG. 8 that shows the flowchart of the process. Steps 401 and 402 perform the same processes as those of steps 301 and 302, respectively, and a description thereof will be omitted. In step 403, the user is notified that use of the device is determined to be prohibited. As the notification method, a message box as shown in FIG. 9 is displayed, or a beep sound is generated. The message box includes, for example, the name of a device connected regardless of prohibition of use in the safe mode and a message representing that use of the device is prohibited. A message to prompt detachment of the device may be included. In addition, a button (for example, OK button) configured to cause the user to input confirmation of the message may be displayed.

<Process 3 of Step 209>

Figure 10:
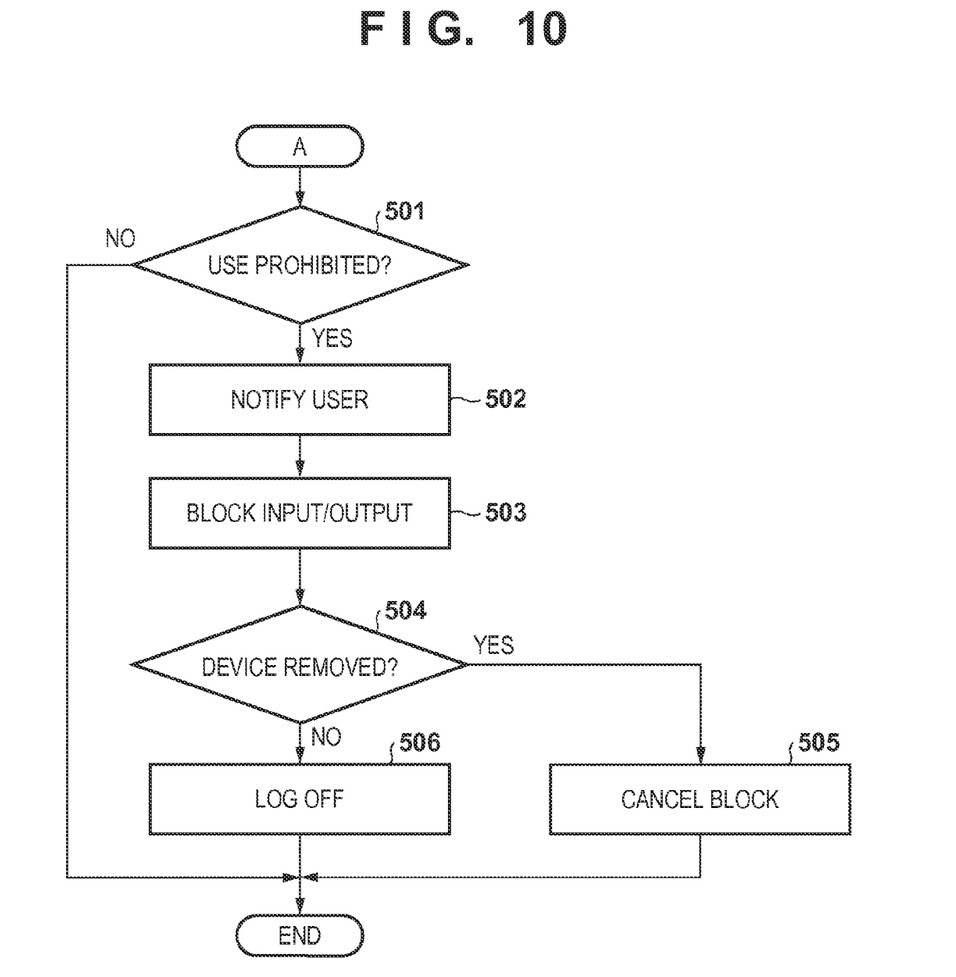
FIG. 10 is a flowchart showing the process of step 209.

Details of still another process of step 209 will be described with reference to FIG. 10 that shows the flowchart of the process. Step 501 performs the same process as that of step 301, and a description thereof will be omitted.

Figure 11:
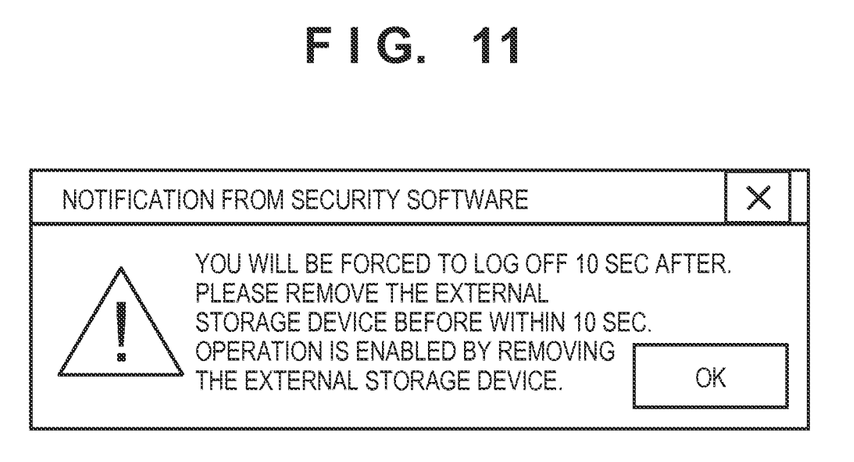
FIG. 11 is a view showing an example of a display screen displayed on the client terminal apparatus.

In step 502, the user is notified that use of the device is prohibited. As the notification method, a message box as shown in FIG. 11 is displayed, or a beep sound is generated. In this example, if a device whose use in the safe mode is prohibited is attached, forced logoff is performed. Hence, the message preferably includes it. In step 503, input/output of the PC is blocked while keeping the message in step 502 displayed, and the process waits for a predetermined data. As the method of blocking input/output, for example, a mouse operation is prohibited, or a keyboard operation is prohibited. Prohibiting the operation can be implemented by prohibiting input acceptance even when the mouse or keyboard is operated. For example, external input/output is disabled for 10 sec during which the message box shown in FIG. 11 is displayed. If network connection is enabled even in the safe mode, communication may further be disabled as part of input/output.

In step 504, it is determined whether the storage medium for which use prohibition is designated has been removed within the predetermined waiting time, for example, 10 sec during which the message box is displayed. If the storage medium has been removed, the process advances to step 505. If not removed, the process advances to step 506. In step 505, input/output block is canceled, and user notification ends. In step 506, the PC is logged off. That is, the user who has been logged in is forcibly logged off. The logoff here is merely an example, and shutdown may be done. Note that in step 504, the determination may be done to branch to step 506 unless the device (storage medium) is removed within the predetermined time after display of the message box.

With the above-described procedure, even in activation in the safe mode, it is possible to limit or prohibit use of a device whose use is limited or prohibited, as in activation in the normal mode. In addition, the user can be notified of it.

If a time is needed to apply actual control after issuance of an access control instruction, a confidential file in the information processing apparatus is at risk of being brought out during that time. However, if control as described above, particularly, shown in FIG. 10 is performed, the PC operation can be disabled by blocking input/output during an application lag generated upon switching the state of the storage medium from the enable state to the disable state, and the security level can be maintained.

As described above, according to this embodiment, in the normal mode, control can be performed using the file system filter driver. In the safe mode, use of a storage medium can be controlled by monitoring the device manager. Note that control by the file system filter driver may be performed in the safe mode, and control by the device manager may be performed in the normal mode.

In this embodiment, the description has been made using the file system filter driver and the device manager. However, the present invention is not limited to this, and packet filtering, API hooking, or the like may be used as long as monitoring/control changes between the safe mode and the normal mode.

According to the security software of this embodiment, even if a system failure occurs in the file system filter driver at the time of activation in the normal mode, activation without a failure is possible in the safe mode, and the same security level as in activation in the normal mode can be maintained. In this embodiment, the control target may be changed depending on the operating mode of the OS, and control of a device other than a storage medium is possible. For example, in a case where the network is to be disconnected, if the OS is activated in the "safe mode", control is not performed because network communication is impossible. However, if the OS is activated in "safe mode and network" (safe mode), network communication is possible. Hence, control can be performed by disabling communication by the device manager. In this embodiment, a printer or a scanner can also be controlled. In this embodiment, a wireless LAN can also be controlled.

[Second Embodiment]

In the first embodiment, storage medium control processing is executed using a file system filter driver in the normal mode and using a device manager in the safe mode. As for security software according to this embodiment, a case where a network is controlled using packet filtering in the normal mode and using a device manager in the safe mode will be described.

Figure 12:
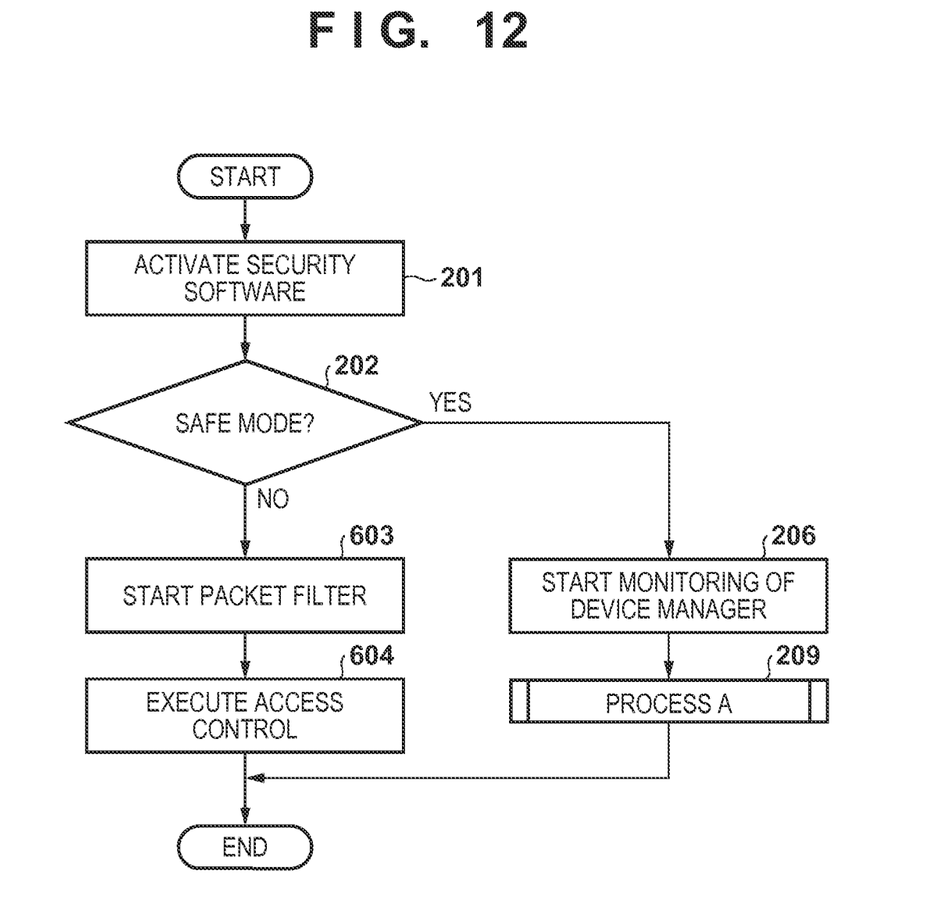
FIG. 12 is a flowchart showing processing according to the second embodiment.

A series of processes performed by a client terminal apparatus 110 to start packet processing and file system filter processing in such a case will be described with reference to FIG. 12 that shows the flowchart of the processing. The same step numbers as in FIG. 6 denote the same processing steps in the flowchart of FIG. 12, and a description thereof will be omitted.

In the normal mode, in step 603, packet filter processing starts to monitor access from an external device or access from the client terminal apparatus 110 to an external device. In step 604, upon detecting access from an external device or access from the client terminal apparatus 110, an IP packet (IP packet information) transmitted by the access is detected by the packet filter of the security software. Information in the detected IP packet, particularly, information of a packet header or the like is analyzed to determine whether the external device is a device whose access is permitted, and access control is executed. This can control mail transmission or network access.

When file system filter processing is performed after packet filter processing, access to a shared folder can be controlled. According to the above embodiment, the network can be disconnected. As another control method in the safe mode, network control may be done by a method of intercepting (to be referred to as hook hereinafter) a system message to be sent to a window of a web browser (for example, API hook or global hook). At this time, a message such as WM_SETTEXT is hooked, it is determined based on the hooked information whether the access destination or access source is a permitted external device or a prohibited external device, and access control is executed. If the access destination or access source is an external device prohibited in the safe mode, an appropriate message representing it is returned to the system to prohibit access. Alternatively, process information may be acquired from the hooked message, and the process may be forced to terminate.

According to the above embodiment, it is possible to analyze a URL included in the hooked message, determine whether access is possible, and control access.

According to the above embodiment, it is possible to record network access and acquire a history of access to a web.

[Third Embodiment]

In the first embodiment, storage medium control processing is executed using a file system filter driver in the normal mode and using a device manager in the safe mode. As for security software according to this embodiment, a case where in the normal mode, control is performed using a file system filter driver, and in the safe mode, a process list (task manager) in which activated processes are listed is periodically acquired, and process activation is monitored, thereby controlling process activation will be described.

In the normal mode, the file system filter driver is loaded, and process activation in a client terminal apparatus 110 is monitored. Upon detecting activation of a process, the file system filter driver acquires process information and compares the process information with a permitted or prohibited process list set in a server apparatus 120. For a permitted process, nothing is performed and the process is pursued. For a prohibited process, processing of ending the process is performed, thereby controlling process activation. Note that the permitted or prohibited process list can be a table in which the identification name of a process and information representing prohibition or permission of the process are registered in association with each other, like, for example, the setting information representing permission or prohibition of a device shown in FIG. 4.

On the other hand, in the safe mode, a process list in which activated processes are listed is periodically acquired and compared with a permitted or prohibited process list set in the server apparatus 120. If the activated process is a permitted process, nothing is performed. If the process is a prohibited process, processing of ending the process is performed, thereby controlling process activation.

In the above-described way, in the safe mode, it is possible to implement process management using a basic function provided by the operating system, that is, the function of acquiring a list of activated processes. This implements security management without departing from the purpose of the safe mode.

In this embodiment, the description has been made using the file system filter driver and process activation monitoring. However, the present invention is not limited to this, and API hooking or the like may be used as long as monitoring/control changes between the safe mode and the normal mode. The permitted or prohibited process list may be shared or separately prepared in the normal mode and the safe mode.

[Fourth Embodiment]

As for security software according to this embodiment, a method of controlling a login user using control of a logon function of Windows in the normal mode and by monitoring the login user in the safe mode will be described.

Figure 13A:
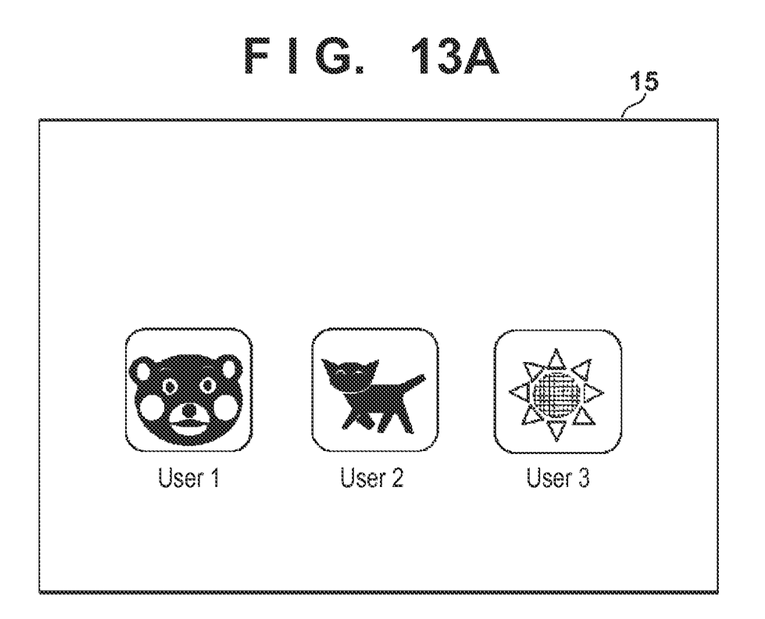
FIGS. 13A and 13B are views showing an example of a display screen displayed on the client terminal apparatus.

The logon function of Windows is a function of displaying a list of users (User1, User2, and User3) with accounts on a display unit 15 as a logon screen after activation of Windows or when logging on to Windows after logout of a user, as shown in FIG. 13A.

Figure 13B:
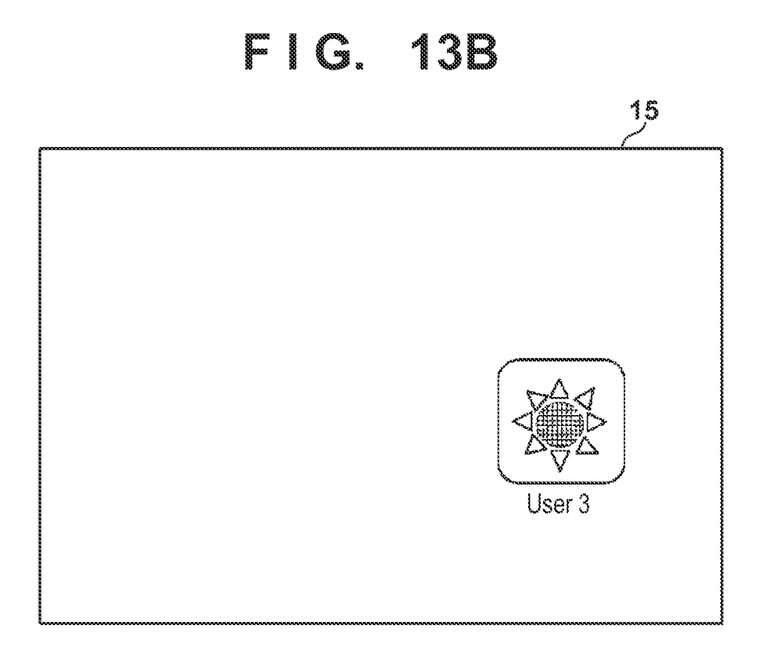

As shown in FIG. 13B, in the normal mode, activation of Windows is monitored, only a specific user (for example, User3) is displayed on the logon screen, and the remaining users (User1 and User2) are controlled to be hidden. The authentication user is controlled by switching the display, thereby allowing only a specific user to log in.

In the safe mode, user information is acquired by monitoring login of a user by hook or the like or listing login users. If a user other than a specific user has logged in, he/she can be forced to log off. Note that the control method in the safe mode and that in the normal mode may be replaced with each other. Note that users permitted to log in and users prohibited from doing login are separately registered, as in, for example, the table of FIG. 4. Users permitted to log in and users prohibited from doing login may change between the normal mode and the safe mode. Control of the logon screen is performed by referring to the table. The security program manages users who can log in using the above-described method according to each of the normal mode and the safe mode by referring to the table. The list of users who are allowed and/or not allowed to log on may be provided for the normal mode and the safe mode separately, or the same list may be provided for any mode.

[Fifth Embodiment]

In the first embodiment, storage medium control processing is executed using a file system filter driver in the normal mode and using a device manager in the safe mode. As for security software according to this embodiment, a case where file sharing is controlled using a file system filter driver in the normal mode and using an SMB (Server Message Block) service used to implement file sharing in the safe mode will be described.

In the normal mode, analysis is performed as in the first embodiment, the IP address (or a destination address of another protocol) of the access destination is acquired, and it is determined whether the access destination is accessible shared folder.

In the safe mode, the SMB service itself that is one of local services is started to permit access or stopped to prohibit access, thereby controlling access. Note that folders permitted to be accessed and folders prohibited from being accessed are separately registered, as in, for example, the table of FIG. 4. Folders permitted to be accessed and folders prohibited from being accessed may change between the normal mode and the safe mode.

Additionally, the followings can be controlled using the file system filter driver, a window message, and API hook.

file encryption/description control for enabling file encryption/description between information processing apparatuses in which security software is installed control of use time of an information processing apparatus As described above in the five embodiments, according to the invention of every embodiment, even in the safe mode, it is possible to manage use of resources and limit use of resources other than those permitted to be used in the safe mode by executing the security program. In the safe mode, the security program itself executes security management using resources usable in the safe mode. It is therefore possible to implement security management without impeding the purpose of the safe mode.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-208330, filed Oct. 9, 2014, and Japanese Patent Application No. 2015-159129, filed Aug. 11, 2015, which are hereby incorporated by reference herein in their entirety.

What is claimed is:

1. An information processing apparatus that operates in one of a normal mode that is a normal program execution mode and a safe mode in which a predetermined minimum software module is executed, the apparatus comprising:

at least one memory; and at least one processor that, when executing instructions stored in the at least one memory, performs the functions of:

a determination unit that determines whether an operating mode is the safe mode or the normal mode; and a management unit that manages security of the information processing apparatus, wherein when the operating mode is determined to be the normal mode by the determination unit, the management unit uses a first unit configured to monitor the information processing apparatus, the first unit monitoring a first resource that is allowed to be used in the normal mode, and when the operating mode is determined to be the safe mode by the determination unit, the management unit uses a second unit configured to monitor the information processing apparatus, the second unit monitoring a second resource that is allowed to be used in the safe mode, wherein the management unit controls use of a device connected to the information processing apparatus by, in the normal mode, the first unit monitoring a file system as the first resource and by, in the safe mode, the second unit monitoring a device manager as the second resource.

2. The apparatus according to claim 1, wherein the security managed by the management unit includes a possibility of connection of the device, and in accordance with the mode determined by the determination unit, the management unit uses either the first unit or the second unit to monitor the connection of the device.

3. The apparatus according to claim 2, wherein when the determining unit determines that the operating mode is the safe mode, the second unit monitors the connection of the device by monitoring a message representing the connection of the device.

4. The apparatus according to claim 2, wherein in a case where use of the device whose connection is detected is prohibited, if the determination unit determines that the operation mode is the safe mode, the management unit sets the device in an unusable state, thereby prohibiting use of the device.

5. The apparatus according to claim 4, wherein in the case where use of the device whose connection is detected is prohibited, if the determination unit determines that the operating mode is the safe mode, the management unit further notifies a user of a message representing that use of the device is prohibited.

6. The apparatus according to claim 5, wherein after input/output to/from the device is blocked, if the device is detached from the information processing apparatus, the management unit cancels the block.

7. The apparatus according to claim 5, wherein after input/output to/from the device is blocked, unless the device is detached from the information processing apparatus within a predetermined time, the management unit makes a user log off who has logged in, or shuts down the information processing apparatus.

8. The apparatus according to claim 2, wherein in a case where use of the device whose connection is detected is prohibited, if the determination unit determines that the operating mode is the safe mode, the management unit blocks input/output to/from the device, thereby prohibiting use of the device.

9. The apparatus according to claim 1, wherein the security managed by the management unit includes a possibility of network access, the management unit further controls a network access, and in accordance with the mode determined by the determination unit, the management unit uses a unit configured to monitor the network access.

10. The apparatus according to claim 9, wherein the management unit records the network access monitored by said unit configured to monitor the network access.

11. The apparatus according to claim 1, wherein the security managed by the management unit includes a possibility of activation of a process, the management unit further controls activation of a process, and in accordance with the mode determined by the determination unit, the management unit uses a unit configured to monitor the activation of the process.

12. The apparatus according to claim 1, wherein the security managed by the management unit includes a possibility of login, the management unit further controls login, and in accordance with the mode determined by the determination unit, the management unit uses a unit configured to monitor the login.

13. The apparatus according to claim 1, wherein the security managed by the management unit includes a possibility of file sharing, the management unit further controls file sharing, and in accordance with the mode determined by the determination unit, the management unit uses a unit configured to monitor the file sharing.

14. The apparatus according to claim 1, wherein a unit monitors at least one of a packet, activation of a process, activation of Windows, login of a user, and an SMB service.

15. The apparatus according to claim 1, wherein one of the first and second unit starts monitoring the information processing apparatus as the normal mode or the safe mode is activated.

16. The apparatus according to claim 1, wherein the device of the information processing apparatus controlled by the management unit is a detachable storage medium.

17. A security management method in an information processing apparatus that operates in one of a normal mode that is a normal program execution mode and a safe mode in which a predetermined minimum software module is executed, comprising:
  determining whether an operating mode is the safe mode or the normal mode; and
  managing security of the information processing apparatus,
  wherein in the managing step, when the operating mode is determined to be the normal mode in the determining step, a first unit is used to monitor the information processing apparatus, the first unit monitoring a first resource that is allowed to be used in the normal mode, and when the operating mode is determined to be the safe mode in the determining step, a second unit is used to monitor the information processing apparatus, the second unit monitoring a second resource that is allowed to be used in the safe mode,
  wherein in the managing, use of a device connected to the information processing apparatus is controlled by, in the normal mode, the first unit monitoring a file system as the first resource and by, in the safe mode, the second unit monitoring a device manager as the second resource.

18. An information processing system that operates in one of a normal mode that is a normal program execution mode and a safe mode in which a predetermined minimum software module is executed, the system comprising:
  at least one memory; and
  at least one processor that, when executing instructions stored in the at least one memory, performs the functions of:
    a determination unit configured to determine whether an operating mode is the safe mode or normal mode; and
    a security management unit configured to manage security of the information processing system,
    wherein when the operating mode is determined to be the normal mode by the determination unit, said security management unit uses a first method of monitoring the information processing system, the first method monitoring a first resource that is allowed to be used in the normal mode, and when the operating mode is determined to be the safe mode by the detection unit, said security management unit uses a second method of monitoring the information processing system, the second method monitoring a second resource that is allowed to be used in the safe mode,
    wherein the management unit controls use of a device connected to the information processing apparatus by, in the normal mode, the first unit monitoring a file system as the first resource and by, in the safe mode, the second unit monitoring a device manager as the second resource.

19. A non-transitory computer-readable storage medium recording a program, the program executing a procedure of causing a computer to operate in one of a normal mode that is a normal program execution mode and a safe mode in which a predetermined minimum software module is executed, the procedure comprising:
  determining whether an operating mode is the safe mode or the normal mode; and
  managing security of the computer,
  wherein in the managing step, a first or second method of monitoring the computer is used, and
  wherein the first method is used when the operating mode is determined to be the normal mode in the determining, the first method monitoring a first resource that is allowed to be used in the normal mode, and the second method is used when the operating mode is determined to be the safe mode in the determining, the second method monitoring a second resource that is allowed to be used in the safe mode,
  wherein in the managing, use of a device connected to the information processing apparatus is controlled by, in the normal mode, the first method monitoring a file system as the first resource and by, in the safe mode, the second method monitoring a device manager as the second resource.

* * * * *